United States Patent [19]
Gloege

[11] 3,788,673
[45] Jan. 29, 1974

[54] TRAILER HITCH
[76] Inventor: Lyle R. Gloege, 843 Greenway Ct., Derby, Kans. 67037
[22] Filed: July 11, 1972
[21] Appl. No.: 270,843

[52] U.S. Cl. ......................... 280/423 R, 280/438 R
[51] Int. Cl. ........................................... B62d 53/00
[58] Field of Search ............... 280/423 R, 504, 438

[56] References Cited
UNITED STATES PATENTS

| | | | |
|---|---|---|---|
| 2,628,106 | 2/1953 | Sturwold | 280/440 X |
| 3,527,476 | 9/1970 | Winckler | 280/423 R |
| 3,659,876 | 5/1972 | Melton | 280/423 R X |

*Primary Examiner*—Leo Friaglia
*Attorney, Agent, or Firm*—Edward L. Brown, Jr.

[57] ABSTRACT

A gooseneck trailer hitch including a vertically positioned tubular member attached to the trailer with a bearing edge at its open end for receipt of a cone-shaped hitch member rotatably mounted on a truck bed having a load bearing flange around the bottom thereof for supporting the bearing edge of the tubular member and a loosely fitting locking pin passing through both the tubular member and cone-shaped hitch member allowing a certain degree of tilt between the tubular member and hitch member.

7 Claims, 5 Drawing Figures

PATENTED JAN 29 1974　　　　　　　　　　　　　　3,788,673

TRAILER HITCH

BACKGROUND OF THE INVENTION

Recent trailer designs have incorporated a hitch design which attaches to the towing vehicles at a point over the rear axle or forward thereof in place of the old ball type hitches which attach to the bumper of the vehicle. This type of trailer, described as a fifth wheel trailer or gooseneck trailer, has many advantages over the conventional type trailers. These trailers are extremely stable when towed in a crosswind without the usual whipping movement of a bumper hitch trailer. They also have a shorter turning radius and better disperse the tongue weight on the towing vehicle. The principal hitch used with these new type trailers is a pivoting horseshoe structure very much like that used with a semi-trailer and cab. The horseshoe structure is pivotally mounted on an elevated platform in the bed of a pickup truck. A converging slot in the horseshoe is shaped for receipt of a vertical pin carried on the trailer. These hitch structures allow pivotal movement between the truck and trailer about two separate axis.

SUMMARY OF THE INVENTION

Compared with the conventional horseshoe hitch, the hitch of the present design is a very simplified and inexpensive structure which also allows pivotal movement between the cab and trailer about two separate axis of rotation. In connecting the present hitch to the trailer, the trailer is first elevated in a stationary position so that the pickup truck can be maneuvered to a position where the hitch member is located approximately under the tubular member. Due to the small diameter of the upper end of the cone-shaped hitch, the initial alignment is not critical. As the trailer is lowered on to the cone-shaped hitch member, the bearing edge of the tubular member comes in contact with a load bearing flange at the bottom of the cone. A locking pin which passes through both the tubular member and hitch member prevents the trailer from jumping off the hitch while the primary loads are carried by the cone member and its load bearing flange.

It is therefore the principal object of the present invention to provide a gooseneck trailer hitch of a simplified design which allows rotational movement between the trailer and cab about two separate axis.

Another object of the present invention is to provide a gooseneck trailer hitch of an extremely simple and inexpensive design.

Other objects and advantages of the present invention will become apparent to those skilled in the art from the following description when read in conjunction with the accompanying drawings wherein.

Figure 1:
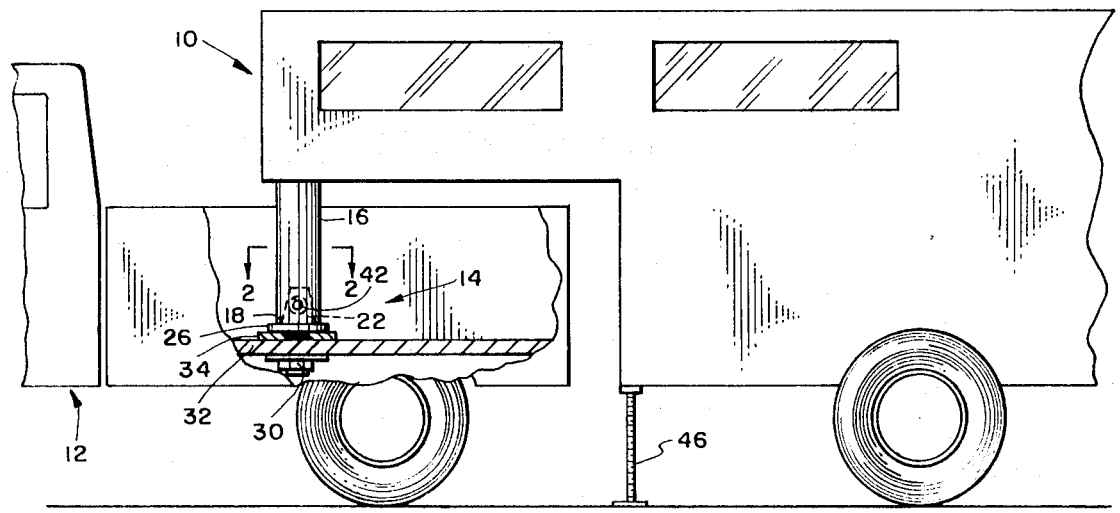
FIG. 1 is a side elevational view of a gooseneck trailer and supporting truck with portions of the truck broken away to illustrate the hitch design of the present invention.

Referring now to the drawings for a detailed description of the invention and more specifically to FIG. 1, a gooseneck trailer 10 is shown hitched to a conventional pickup truck 12 by means of a trailer hitch structure generally identified by reference numeral 14. The hitch 14 includes a tubular member 16 extending downwardly from the trailer 10 terminating in a load bearing edge 18. Receivable in the open end 20 of the tubular member is a cone-shaped hitch member 22 with an outwardly extending load bearing flange 26 formed at the bottom of the cone. The bottom diameter of the cone is approximately equal to the inside diameter of the tubular member 16 so as to prevent any horizontal movement between the trailer 10 and truck 12 when the hitch 14 is engaged. Integrally formed on the bottom of hitch member 22 is a boss 28 with a nut and washer 30 threadably mounted at the lower end thereof. Attached to the bed of the truck 32 is a lateral support member 34 which extends across the width of the bed and provides a bearing surface for the rotating hitch member 22. The under surface of load bearing flange 26 would be normally lubricated to allow free rotation of hitch member 22. Located in the cone-shaped hitch member 22 is an enlarged lateral opening 36 for receipt of a locking pin 40. Locking pin 40 is supported in a pair of lateral holes 42 located at the lower end of tubular member 16. A cotter pin 44 passing through the end of locking pin 40 retains the locking pin in place.

OPERATION

Figure 2:
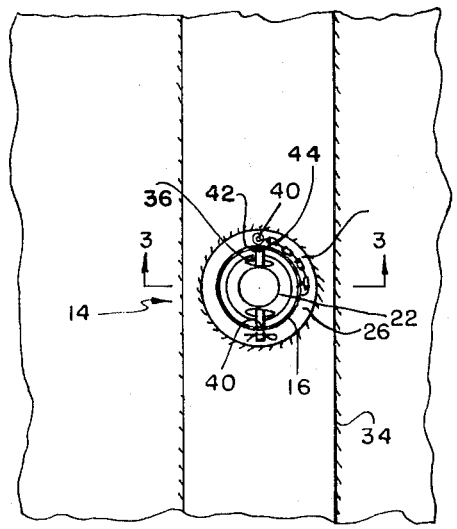
FIG. 2 is a sectional view taken along lines 2 — 2 of FIG. 1 with portions of the truck broken away.
Figure 3:
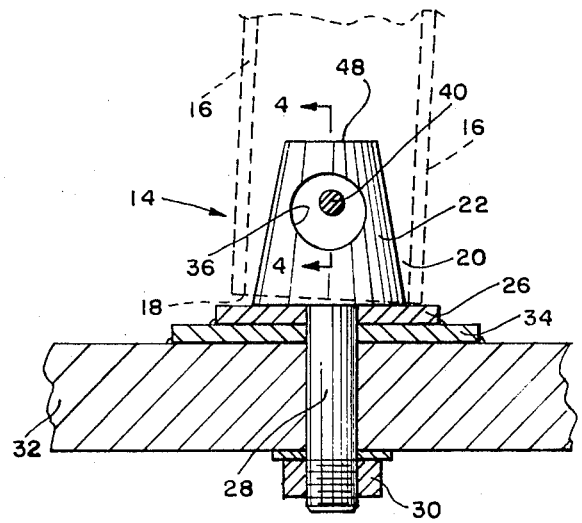
FIG. 3 is an enlarged sectional view taken along lines 3 — 3 of FIG. 2.
Figure 5:
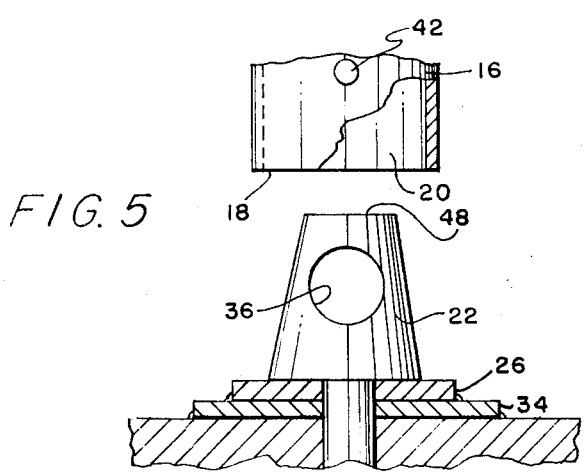
FIG. 5 is an elevational view of the hitch in its disengaged position.
Figure 4:
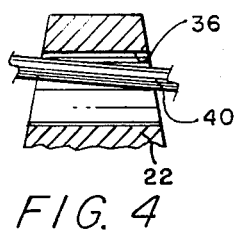
FIG. 4 is a sectional view taken along lines 4 — 4 of FIG. 3.

To engage the hitch coupling 14, the trailer 10 is elevated by jack members 46 so that the free end of the tubular member 16 is positioned above the hitch member 22, as seen in FIG. 5. Since the upper end 48 of the hitch member has a substantially smaller diameter, than the opening 20, the initial alignment does not need to be very accurate. Jacks 46 are now lowered, allowing the cone-shaped member to be received into the opening 20. With the bearing edge 18 coming to rest on flange 26. Locking pin 40 is then inserted through holes 42 in the tubular member, which also passes through opening 36 in the hitch member. Since the hitch member 22 is rotatably journaled on member 34, the trailer 10 is free to rotate about the vertical axis of boss member 28. The trailer 10 may tilt about a horizontal axis with relation to pickup truck 12 by tilting the tubular member 16, as seen in FIG. 3 in dotted line. Due to the enlarged opening 36, the locking pin 40 is allowed to move from its previous concentric position (FIG. 2) to its position seen in FIGS. 3 and 4. The tapered shape of hitch member 22 allows the tubular member to tilt in a certain angle in any direction. While in this tilted position, the lateral loads on the hitch are still transmitted across the cone in the same manner as would be true in the untilted position. The tubular member 16 and its connecting trailer 10 can also tilt in a sideways direction due to the size of opening 36, as seen in FIG. 4.

While the load bearing 26 is shown as a separate piece from hitch member 22, in FIG. 3, it can also be cast as an integral part of hitch member 22.

Having thus described the several useful and novel features of the trailer hitch coupling, of the present invention, it will be seen that the many worthwhile objectives for which it was designed have been achieved. Although but a single specific embodiment of the hitch has been illustrated and described herein, we realize that certain changes may well occur to those skilled in the art within the broad teaching hereof; hence, it is our intention that the scope of protection afforded hereby shall be limited only insofar as said limitations are expressly set forth in the appended claims.

What is claimed is:

1. A trailer hitch coupling for use on a gooseneck trailer and pickup truck comprising:
- a vertically positioned tubular member extending downwardly from the trailer, having a planar bearing edge at its open end;
- a lateral hole in the tubular member approximate the open end;
- a cone-shaped hitch member having a lateral opening therein, the hitch member being shaped for receipt in the open end of the tubular member;
- a load bearing flange extending outwardly from the bottom of the cone for mating support of the bearing edge of the tubular member;
- mounting means attaching the hitch member to the bed of the pickup truck for rotatable movement about a vertical axis; and
- a removable locking pin means receivable in the lateral hole in the tubular member, and the lateral opening in the hitch member for locking the hitch coupling together, the diameter of the lateral opening in the hitch member being sufficiently larger than the diameter of the locking pin means to allow the tubular member of the hitch to tilt on the cone-shaped member.

2. A trailer hitch coupling as set forth in claim 1, wherein the mounting means is a swivel connection allowing the hitch member to freely rotate thereon.

3. A trailer hitch coupling as set forth in claim 1, wherein the mounting means is an integrally formed threaded boss extending downwardly from the load bearing flange and a removable nut threadably received on said boss.

4. A trailer hitch coupling as set forth in claim 1, wherein the inside diameter of the tubular member being substantially equal to the diameter of the hitch member at the bottom of the cone.

5. A trailer hitch coupling as set forth in claim 1, including a flat lubricated bearing surface anchored to the bed of the truck positioned beneath the load bearing flange whereby the hitch member is allowed to freely rotate thereon.

6. A trailer hitch coupling as set forth in claim 1, wherein the diameter of the lateral opening in the hitch member is at least twice the diameter of the locking pin means to allow the tubular member to tilt on the cone-shaped hitch member while the hitch coupling is locked together.

7. A trailer hitch coupling as set forth in claim 1, wherein the diameter of the lateral opening in the hitch member is at least twice the diameter of the locking pin means and the lateral hole in the tubular member is concentrically positioned with respect to the lateral opening in the hitch member when the bearing edge of the tubular member is in contact with the load bearing flange.

* * * * *